United States Patent
Liao et al.

(10) Patent No.: US 9,461,851 B1
(45) Date of Patent: Oct. 4, 2016

(54) CIRCUITS FOR AND METHODS OF ROBUST ADAPTATION OF A CONTINUOUS TIME LINEAR EQUALIZER CIRCUIT

(71) Applicant: Xilinx, Inc., San Jose, CA (US)

(72) Inventors: Yu Liao, Longmont, CO (US); Geoffrey Zhang, San Jose, CA (US)

(73) Assignee: XILINX, INC., San Jose, CA (US)

( * ) Notice: Subject to any disclaimer, the term of this patent is extended or adjusted under 35 U.S.C. 154(b) by 0 days.

(21) Appl. No.: 14/885,666

(22) Filed: Oct. 16, 2015

(51) Int. Cl.
*H03K 5/159* (2006.01)
*H04L 27/01* (2006.01)
*H04L 25/03* (2006.01)

(52) U.S. Cl.
CPC ......... *H04L 27/01* (2013.01); *H04L 25/03019* (2013.01)

(58) Field of Classification Search
CPC ................ H04L 25/03057; H04L 25/03019; H04L 2025/03617; H04L 2025/0349; H04L 25/03038
USPC ................ 375/233, 229, 230, 232; 341/155
See application file for complete search history.

(56) References Cited

U.S. PATENT DOCUMENTS

| | | |
|---|---|---|
| 8,995,514 B1 | 3/2015 | Asuncion et al. |
| 9,054,645 B1 | 6/2015 | Wang et al. |
| 9,065,601 B1 | 6/2015 | Jenkins et al. |
| 2006/0239341 A1* | 10/2006 | Marlett ............ H04L 25/03057 375/233 |
| 2010/0046598 A1* | 2/2010 | Zhong ............... H04L 25/03038 375/233 |
| 2012/0076181 A1* | 3/2012 | Aziz ................. H04L 25/03057 375/219 |
| 2012/0183092 A1* | 7/2012 | Pelekhaty .......... H04L 25/0384 375/285 |
| 2013/0050005 A1* | 2/2013 | Liu ....................... H03H 17/06 341/155 |

FOREIGN PATENT DOCUMENTS

WO   2015094865   6/2015

* cited by examiner

*Primary Examiner* — Daniel Washburn
*Assistant Examiner* — Fitwi Hailegiorgis
(74) *Attorney, Agent, or Firm* — John J. King

(57) ABSTRACT

A circuit for enabling an adaptation of an equalization circuit is described. The circuit comprises a continuous time linear equalizer configured to receive an input data signal and generate an equalized input data signal; a decision circuit configured to receive the equalized input data signal, wherein the decision circuit generates an estimate of the input data signal; channel estimation circuit configured to receive the estimate of the input data signal and an error signal to generate an impulse response estimate of an equivalent channel; a frequency response computation circuit configured to receive the impulse response estimate of the equivalent channel and generate a channel frequency response; and a continuous time linear equalizer control circuit configured to receive the channel frequency response and to generate a CTLE adaptation signal for controlling the continuous time linear equalizer.

18 Claims, 4 Drawing Sheets

CIRCUITS FOR AND METHODS OF ROBUST ADAPTATION OF A CONTINUOUS TIME LINEAR EQUALIZER CIRCUIT

FIELD OF THE INVENTION

The present invention relates generally to integrated circuit devices, and in particular, to circuits for and methods of enabling the adaptation of an equalizer circuit.

BACKGROUND OF THE INVENTION

High speed serial communication is an important function in many communication systems. A continuous time linear equalizer (CTLE) is a necessary circuit in a receiver system for high speed serial link communications. A CTLE performs equalization in an analog domain by properly shaping high frequency content with respect to the low frequency content of the received signal. This analog domain equalization helps in any necessary subsequent equalization and detection either in the analog domain or the digital domain. A CTLE needs to be adapted to give proper high frequency shaping for various operating conditions.

Normally, a CTLE has two stages including one stage that targets the middle band frequency shaping and another stage that targets the frequency around the Nyquist frequency. Many CTLE circuits are implemented with a decision feedback equalizer (DFE) circuit. Conventional CTLE adaptation circuits control the high frequency shaping by either examining the zero crossing signatures of the signal (in non-DFE mode) or the tail of DFE taps (in DFE mode), which are used after the CTLE stages to cancel out the post-cursor ISI. That is, the tail of DFE taps represents an indication of the mid-band frequency content of the signal after CTLE stages.

However, conventional CTLE implementations have considerable drawbacks. For example, the zero crossing information needs oversampling clocks that consume power at high data rate. Also, DFE equalization either in the analog domain or the digital domain requires considerable power to achieve the desired high data rate. Finally, a CTLE adaptation based on DFE taps in the time domain is associated with a DFE adaptation, which may result in interactions between the CTLE adaptation and the DFE adaptation, causing an unstable receiver or compromised bit error rate (BER) performance.

Accordingly, circuits and methods which enable the adaptation of an equalizer circuit while overcoming the drawbacks of conventional circuits are desirable.

SUMMARY OF THE INVENTION

A circuit for enabling an adaptation of an equalization circuit is described. The circuit comprises a continuous time linear equalizer configured to receive an input data signal and generate an equalized input data signal; a decision circuit configured to receive the equalized input data signal, wherein the decision circuit generates an estimate of the input data signal; channel estimation circuit configured to receive the estimate of the input data signal and an error signal to generate an impulse response estimate of an equivalent channel; a frequency response computation circuit configured to receive the impulse response estimate of the equivalent channel and generate a channel frequency response; and a continuous time linear equalizer control circuit configured to receive the channel frequency response and to generate a CTLE adaptation signal for controlling the continuous time linear equalizer.

A method of enabling an adaptation of an equalization circuit is also described. The method comprises performing equalization on an input data signal to generate an equalized input data signal; generating an estimate of the input data signal; calculating an impulse response estimate of an equivalent channel based upon the estimate of the input data signal and an error signal; calculating a channel frequency response based upon the impulse response estimate; and calculating a CTLE adaptation signal based upon the channel frequency response for controlling the continuous time linear equalizer.

Other features will be recognized from consideration of the Detailed Description and the Claims, which follow.

DETAILED DESCRIPTION

The circuits and methods set forth below relate to adaptation techniques of a CTLE for low power serializer-deserializer (SerDes) applications, The circuits and methods eliminate the need for oversampling clocks, and in some implementations, DFE circuits. The CTLE adaptation is based on an equivalent channel estimation and the corresponding frequency response computation. The circuits and method estimate an equivalent channel impulse response and calculate the frequency response at DC, half of the Nyquist frequency and Nyquist frequency, where the CTLE adaptation is based on the ratios between the frequency response of the half-Nyquist and DC frequencies, and the Nyquist and DC frequencies. The circuits and methods save power and result in less adaptation fluctuations, and therefore less noise in a receiver.

While the specification includes claims defining the features of one or more implementations of the invention that are regarded as novel, it is believed that the circuits and methods will be better understood from a consideration of the description in conjunction with the drawings. While various circuits and methods are disclosed, it is to be understood that the circuits and methods are merely exemplary of the inventive arrangements, which can be embodied in various forms. Therefore, specific structural and functional details disclosed within this specification are not to be interpreted as limiting, but merely as a basis for the claims and as a representative basis for teaching one skilled in the art to variously employ the inventive arrangements in virtually any appropriately detailed structure. Further, the terms and phrases used herein are not intended to be limiting, but rather to provide an understandable description of the circuits and methods.

Figure 1:
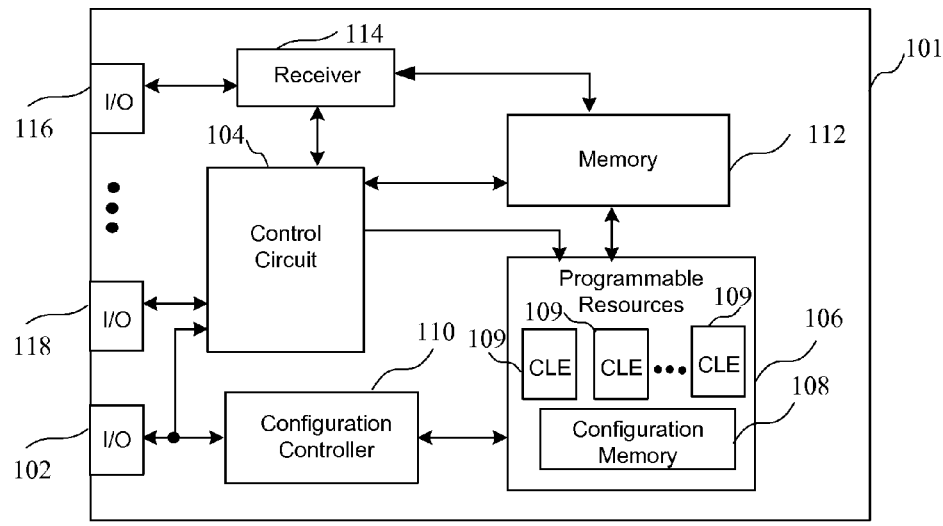
FIG. 1 is a block diagram of an integrated circuit device having a receiver circuit for receiving data.

Turning first to FIG. 1, a block diagram of an integrated circuit device 101 having a receiver circuit for receiving data is shown. In particular, an input/output port 102 is coupled to a control circuit 104 that controls programmable resources 106 having configuration memory 108. Configuration data may be provided to the configuration memory 108 by a configuration controller 110. The configuration data enables the operation of configurable logic elements 109. While CLEs are shown by way of example as one type of programmable resources, it should be understood that other circuit elements could be implemented. A memory 112 may be coupled to the control circuit 104 and the programmable resources 106. A receiver circuit 114 may be coupled to the control circuit 104, programmable resources 106 and the memory 112, and may receive signals from the integrated circuit device by way of an I/O port 116. Other I/O ports may be coupled to circuits of the integrated circuit device, such as I/O port 118 that is coupled to the control circuit 104 as shown. The circuits and methods described in more detail below may be implemented by various elements of the circuit of FIG. 1, and particularly in the receiver circuit 114.

Figure 2:
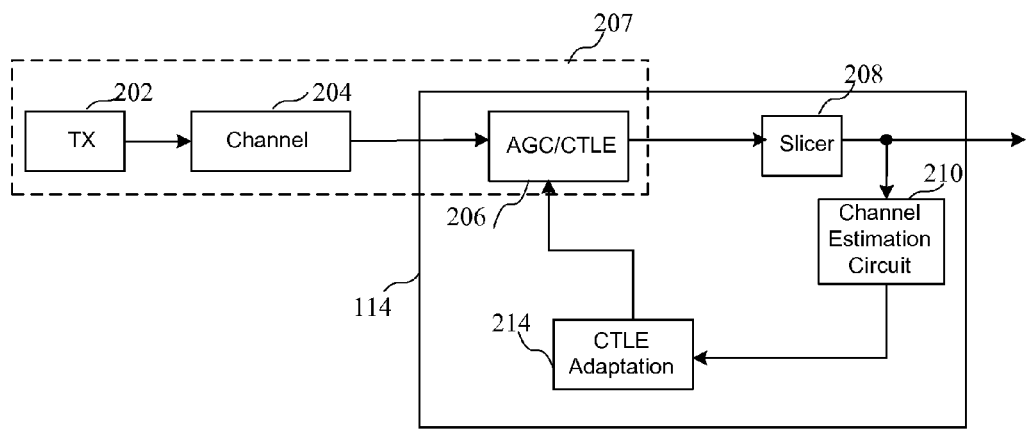
FIG. 2 is a block diagram of a circuit for enabling an adaptation of an equalizer circuit.

Turning now to FIG. 2, a block diagram of a circuit for enabling an adaptation of an equalizer circuit is shown. In particular, a transmitter 202 transmits data by way of a channel 204, where the data is received by the receiver circuit 114. The receiver circuit 114 comprises an automatic gain control (AGC) and CTLE circuit 206 coupled to receive input data, where an equivalent channel 207 associated with data transmitted to the receiver is defined by the transmitter 202, the channel 204 and the AGC/CTLE circuit 206. An output of the AGC/CTLE circuit 206 is coupled to a slicer circuit 208, also known as a decision circuit. It should be noted that the slicer circuit 208 comprises both data slicers to generate decisions and error slicers to generate error signals. The slicer circuit generates a decision representing estimated data related to the value of the received input data, such as whether the input data is a logical zero or a logical one, and an error signal. The output data and error signal generated by the slicer circuit are coupled to a channel estimation circuit 210, which generates an impulse response that is coupled to a CTLE adaptation circuit 214. The CTLE adaptation circuit 214 generates a frequency response based upon the impulse response and adjusts the operation of the CTLE of the AGC/CTLE circuit 206. Additional details related to the operation of the CTLE adaptation circuit will be described in more detail in reference to FIG. 3.

Figure 3:
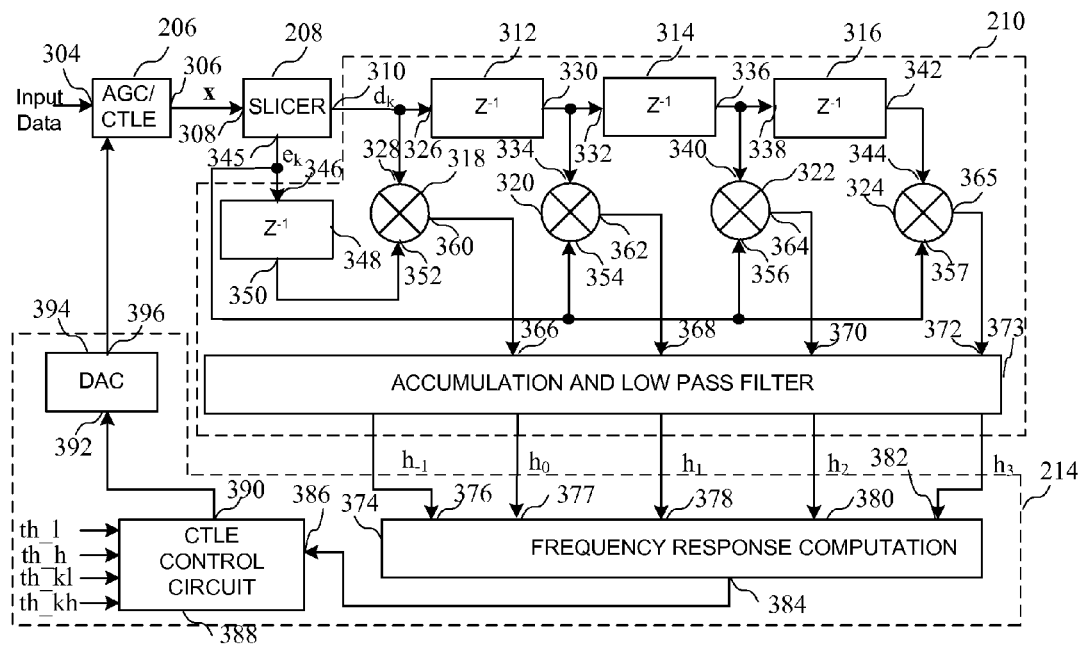
FIG. 3 is a more detailed block diagram of the circuit of FIG. 2.

Turning now to FIG. 3, a more detailed block diagram of the circuit of FIG. 2 is shown. In particular, the AGC/CTLE circuit 206 comprising a continuous time linear equalizer receives an input data signal (Input Data) at an input 304 and generates an equalized input data signal x at an output 306. The equalized input data signal x is provided to an input 308 of the slicer circuit 208, where the decision output $d_k$ is coupled to the channel estimation circuit 210 and used to generate an estimate of a sampled equivalent channel. The decision output $d_k$ of the slicer circuit at output 310 represents an estimate of the input data and is coupled to a plurality of delay elements 312, 314, and 316. The decision output $d_k$ is coupled to a multiplier 318 and delayed decision outputs of each of the delay elements is coupled to a corresponding multiplier 320, 322, and 324. More particularly, the decision output $d_k$ is coupled to an input 326 of the delay element 312 and an input 328 of the multiplier 318. A delayed decision output generated at the output 330 of the delay element 312 is coupled to an input 332 of the delay element 314 and an input 334 of the multiplier 320. Further, a delayed decision output generated at the output 336 of the delay element 314 is coupled to an input 338 of the delay element 316 and an input 340 of the multiplier 322. Finally, a delayed decision output generated at the output 342 is coupled to an input 344 of the multiplier 324.

An error signal $e_k$ generated at an output 345 of the slicer circuit is coupled to each of the multipliers. More particularly, the error signal $e_k$ is coupled an input 346 of a delay element 348, an output 350 of which is coupled to an input 352 of the multiplier 318. The error signal $e_k$ represents an estimated error associated with the equalized input data signal x and is also coupled to each of the other multipliers 320-324. That is, error signal $e_k$ is coupled to an input 354 of the multiplier 320, to an input 356 of the multiplier 322, and to an input 357 of the multiplier 324. The multiplier outputs 360-365 are estimations of the correlations between the error signal and data signal. Outputs 360-365 are further coupled to corresponding inputs 366-372 of an accumulation and low pass filter circuit 373, where an average product of the error signal and the data, which is an indication of the channel impulse response, can be generated.

The accumulation and low pass filter circuit 373, by accumulation and low pass filtering the correlations between the estimated data signal and error signal, generates an estimate of the equivalent channel, represented by $h_{-1}$, $h_0$, $h_1$, $h_2$, and $h_3$, where $h_{-1}$ is the estimated first precursor tap, $h_0$, the main cursor tap, is normalized to 1, and $h_1$, $h_2$, and $h_3$ are the estimated post-cursor taps. The equivalent channel is the combination of the transmitter 202, the channel 204, and the AGC/CTLE circuit 206. The impulse response estimate of the equivalent channel $h_{-1}$, $h_0$, $h_1$, $h_2$, and $h_3$ is coupled to a frequency response computation circuit 374 at inputs 376-380, respectively. A channel frequency response estimation of the equivalent channel generated at an output 384 is coupled to an input 386 of a CTLE control circuit 388. CTLE control signals generated at an output 390 of the CTLE control circuit 388 are coupled to an input 392 of a digital-to-analog converter (DAC) circuit 394. Analog CTLE control signals at an output 396 of the DAC circuit 394 is coupled to the AGC/CTLE circuit 206. The CTLE control signals, which will be described in more detail below, control the operation of the CTLE to provide proper equalization.

The impulse response estimate of the equivalent channel generated at the output of the accumulation and low pass filter circuit 373 is given by:

$$\hat{c}h=[h_{-1},h_0,h_1,h_2h_3].$$

The DC and Nyquist (nyq) frequency responses can be calculated by the frequency response computation circuit 374 as follows:

$$dc=|h_{-1}+h_0+h_1+h_2+h_3|; \text{ and}$$

$$nyq=|h_{-1}-h_0+h_1-h_2+h_3|.$$

The mid-band, which may be a half-Nyquist frequency for example, can be calculated as follows:

$$x=h_{-1}-h_1+h_2+h_3;$$

$$y=h_0-h_2+h_3;$$

where the half-Nyquist (nyg_half) frequency response is $$nyq\_half=sqrt(x^2+y^2).$$

It should be noted that the DC frequency, the Nyquist frequency and the half-Nyquist frequency are well known, where the DC frequency is 0 Hz, the Nyquist frequency is $f_0/2$ Hz and the half-Nyquist frequency is $f_0/4$ Hz for a baud rate of $f_0$. The computation of the DC frequency response, the Nyquist frequency response, and the half-Nyquist frequency response of the channel can be performed in arithmetic circuits in hardware or in software, or a combination of hardware and software using the elements of FIG. 1 for example.

The adaptation error associated with the Nyquist frequency is calculated by the CTLE control circuit 388 using the following equations:

$$f\_l = th\_l * dc \text{ and } f\_h = th\_h * dc;$$

where th_l and th_h are programmable threshold values, and the adaptation error generated by the CTLE control circuit 388 is given by the following:

If $nyq < f\_l$, then error=1;

If $f\_l \le nyq \le f\_h$, then error=0; and

If $nyq > f\_h$, then error=-1.

The CTLE adaptation is calculated by the equation $kh = kh + \mu * error$, where $\mu$ is a programmable update gain that controls the bandwidth of the CTLE adaptation loop.

The adaptation error associated with the half-Nyquist frequency is calculated using the following equations:

$$f\_kl = th\_kl * dc \text{ and } f\_kh = th\_kh * dc;$$

where th_kl and th_kh are also programmable threshold values, and the adaptation error is given by the following:

If $nyq\_half < f\_kl$, then error=1;

If $f\_kl \le nyq\_half \le f\_kh$, then error=0; and

If $nyq\_half > f\_lh$, then error=-1.

The CTLE adaptation is calculated by $kl = kl + \mu * error$, where $\mu$ is the programmable update gain that controls the bandwidth of the CTLE adaptation loop. Accordingly the kh and kl signals are calculated by the CTLE control circuit 388 to control the CTLE equalization near Nyquist frequency and half Nyquist frequency, respectively. It should be noted that in some cases only kh needs to be adapted to control the CTLE equalization where kl can be preset or uses the same value as adapted kh. The computations performed by the CTLE control circuit 388 can be performed in arithmetic circuits in hardware or in software, or a combination of hardware and software using the elements of FIG. 1, for example.

The continuous time linear equalizer control circuit calculates a first CTLE adaptation signal kh that controls frequency shaping of the continuous time linear equalizer near the Nyquist frequency based upon a ratio between the Nyquist frequency response and the DC frequency response of the equivalent channel. For example, it may be beneficial to have a ratio of the Nyquist frequency response to the DC frequency response between the threshold values th_l and th_h, where $th\_l < |nyq|/|DC| < th\_h$, which is equivalent to $th\_l * |DC| < |nyq| < th\_h * |DC|$.

Similarly, the continuous time linear equalizer adaptation control circuit also calculates a second CTLE adaptation signal kl that controls frequency shaping of the continuous time linear equalizer near a mid-band frequency, such as the half-Nyquist frequency, based upon a ratio between the mid-band frequency response and the DC frequency response of the equivalent channel. For example, it may be beneficial to have a ratio of the half-Nyquist frequency response to the DC frequency response between the threshold values th_kl and th_kh, where $th\_kl < |nyq\_half|/|DC| < th\_kh$, which is equivalent to $th\_kl * |DC| < |nyq\_half| < th\_h * |DC|$. Accordingly, the th_l, th_h, th_kl and th_kh values can be selected to insure that the CTLE adaptation signals control frequency shaping of the continuous time linear equalizer near the Nyquist and half-Nyquist frequencies.

The circuit of FIG. 3 does not require an oversampling clock or a DFE in an analog receiver, and therefore is beneficial when implemented in low power applications. The circuit of FIG. 3 is also beneficial when implemented in an arrangement having a short backplane length (i.e. the distance connecting two chips or boards), also known as short reach applications.

Figure 4:
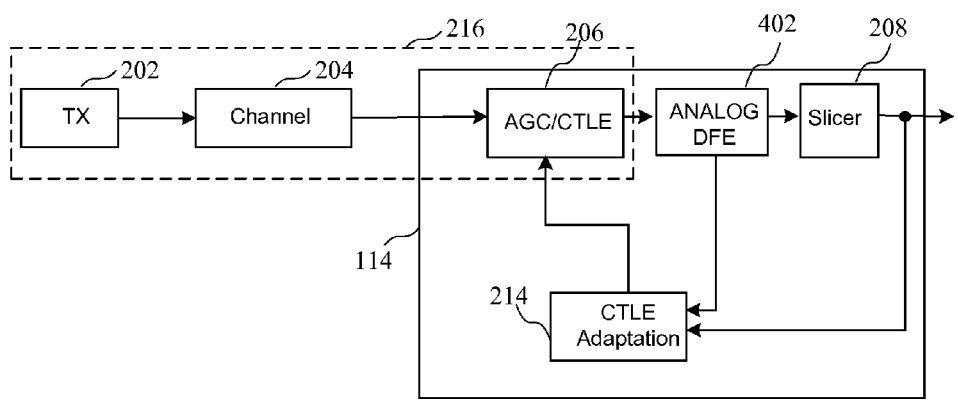
FIG. 4 is a block diagram of circuit having an analog DFE circuit for enabling an adaptation of an equalizer circuit.
Figure 5:
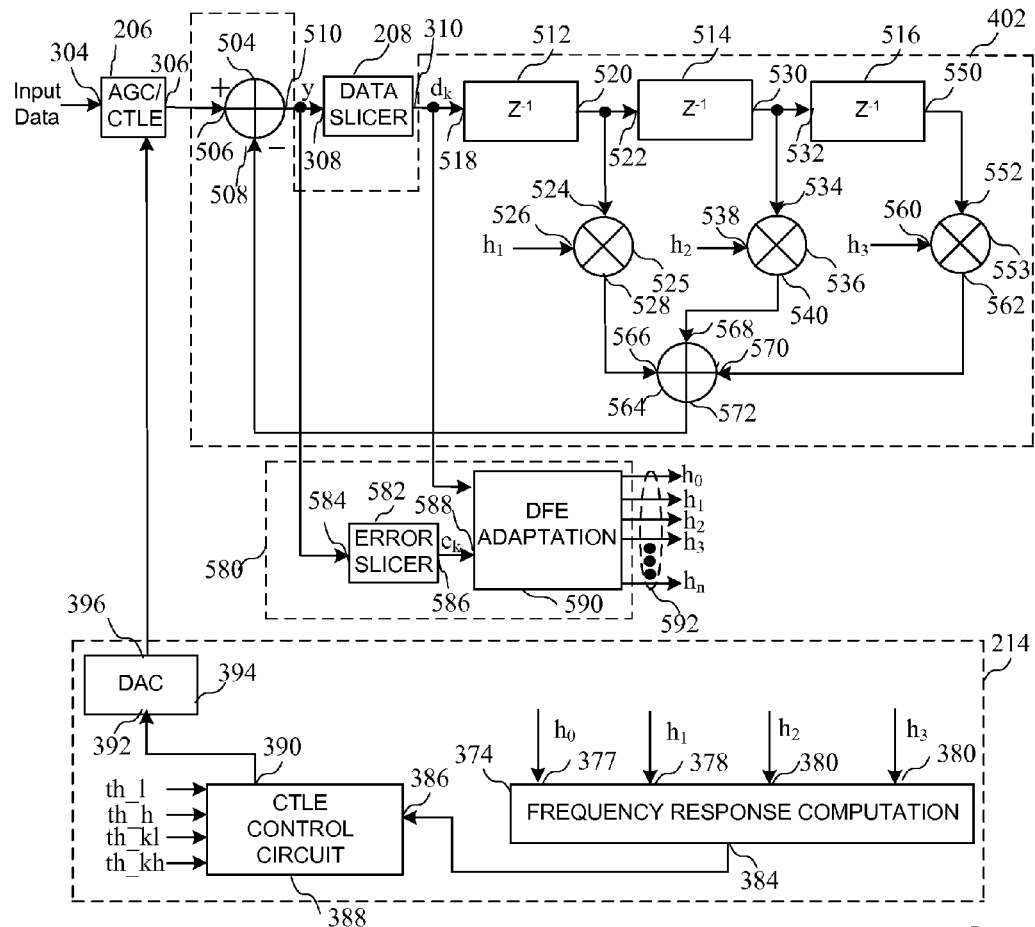
FIG. 5 is a more detailed block diagram of the circuit of FIG. 4.

Turning now to FIGS. 4 and 5, block diagrams of another circuit for enabling an adaptation of a CTLE equalizer circuit have an analog DFE 402 coupled to the AGC/CTLE circuit 206. As shown in detail in FIG. 5, the analog DFE 402 comprises a subtractor 504 coupled to receive the output of the AGC/CTLE circuit 206 at an input 506 and a feedback signal at an input 508. An equalized signal y generated at an output 510 is coupled to the input 308 of the data slicer 208, where the data slicer output $d_k$ is coupled to a series of delay elements 512-516 at an input 518 of the delay element 512. The delay elements have outputs coupled to corresponding multiplier circuits. In particular, an output 520 of the delay element 512 is coupled to an input 522 of the delay elements 514 and an input 524 of a multiplier 525 that is also coupled to receive a first DFE tap $h_1$ at an input 526, and generate an output signal at an output 528. An output 530 of the delay element 514 is coupled to an input 532 of the delay elements 516 and an input 534 of a multiplier 536 that is also coupled to receive a second DFE tap $h_2$ at an input 538, and generate an output signal at an output 540. An output 550 of the delay element 516 is coupled to an input 552 of a multiplier 553 that is also coupled to receive a third DFE tap $h_3$ at an input 560, and generate an output signal at an output 562. The outputs of the multiplier circuits are coupled to an adder circuit 564. In particular, the output 528 of the multiplier 525 is coupled to a first input 566, the output 540 of the multiplier 536 is coupled to a second input 568, and an output 562 of the multiplier 553 is coupled to a third input 570. An output 572 is fed back to the subtractor 504 at the input 508. It should be noted this figure shows an example of 3-tap DFE, an in some other cases, the DFE can have different number of taps.

A DFE adaptation circuit 580 including a second slicer is implemented to generate DFE coefficients comprising the DFE taps $h_0$, $h_1$, $h_2$, $h_3$ ... $h_n$. In particular, an error slicer 582 is coupled, at an input 584, to the output 510 of the subtractor circuit. The error slicer generates error samples $e_k$ at an output 586 that is coupled to an input 588 of a DFE adaptation circuit 590. The DFE adaption circuit 590 is also coupled to receive the estimated data $d_k$. With the data $d_k$ and error samples $e_k$ available, the DFE taps can be calculated using various algorithms, for example, LMS (Least Mean Square) algorithm. The DFE taps $h_0$, $h_1$, $h_2$, $h_3$ ... $h_n$ are generated at outputs 592 of the DFE adaptation circuit 590. The DFE taps $h_0$, $h_1$, $h_2$, $h_3$ ... $h_n$ are used by the analog DFE 402 to generate an estimation of the post cursor ISI to cancel out the post cursor ISI at the output 306 of the AGC/CTLE circuit 206. The DFE taps can also be used to approximate the impulse response of the equivalent channel, where [$h_0$, $h_1$, $h_2$, $h_3$, ..., $h_n$] represents an estimation of the impulse response of the equivalent channel. That is, the DFE adaptation circuit 580 operates as a channel estimation circuit, and these taps are used by the CTLE adaptation circuit 214 to calculate the frequency response of the equivalent channel to control the CTLE equalization as described above in reference to FIG. 3.

The circuit of FIG. 5 is beneficial when implemented in medium reach applications. Because there is less interaction between the CTLE adaptation and DFE adaptation in medium reach applications, there is less adaptation noise for the CTLE adaptation.

Figure 6:
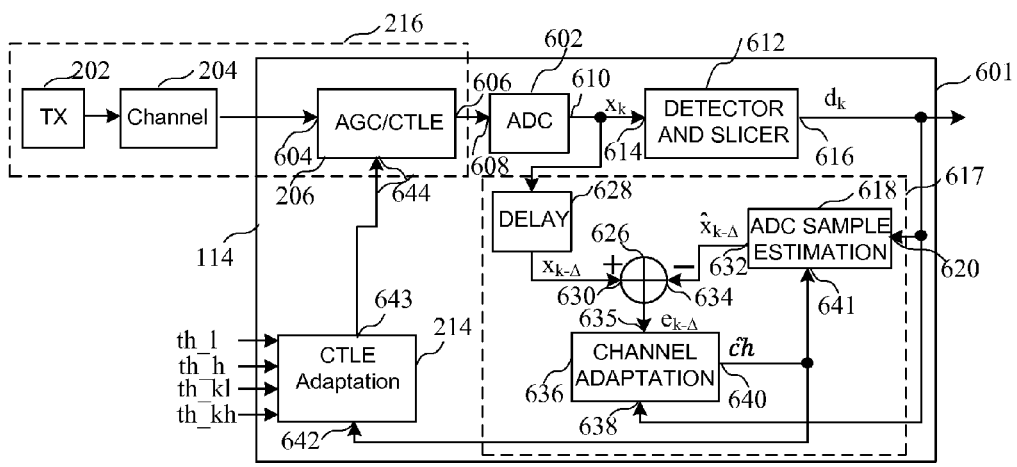
FIG. 6 is a block diagram of a circuit having an analog-to-digital converter for enabling an adaptation of an equalizer circuit.

Turning now to FIG. 6, a block diagram of a further circuit for enabling an adaptation of a CTLE equalizer circuit is shown. In particular, a receiver 601 comprises the AGC/CTLE circuit 206 coupled to an analog-to-digital converter (ADC) circuit 602, where the input data signal is coupled to an input 604 of the AGC/CTLE circuit 206, and an output 606 is coupled to an input 608 of the ADC circuit 602. The digital sample $x_k$ generated at output 610 is coupled to a detector and slicer 612 at an input 614. The detector and slicer 612 operates as a decision circuit and generates the estimated data $d_k$ at an output 616. The estimated data $d_k$ is coupled to a channel estimation circuit 617, and more particularly an ADC sample estimation circuit 618 at an input 620. The channel estimation circuit 617 also comprises an subtractor circuit 626 coupled to a delay element 628 that receives the digital ADC sample $x_k$, and generates a delayed ADC sample $x_{k-\Delta}$ that is coupled to a first input 630 of the subtractor circuit 626. The ADC sample estimation $\hat{x}_{k-\Delta}$ generated at an output 632 is coupled the subtractor circuit 626 to generate an error sample $e_{k-\Delta}$. The error sample $e_{k-\Delta}$ is coupled to an input 635 of a channel adaptation circuit 636, which is also coupled to receive the estimated data $d_k$ at an input 638. An output of the channel comprising the estimated equivalent channel $\widehat{ch} = [h_{-1}, h_0, h_1, h_2, h_3]$ is coupled to both the ADC sample estimation circuit 618 at an input 641 and the CTLE adaptation circuit 214 at an input 642.

The detector and slicer 612 of FIG. 6 can be an all pass filter, an FFE equalizer, or an FFE equalizer and a DFE equalizer. The slicer operates on the detector output to generate the estimated data $d_k$. The equivalent channel in the ADC-based receiver of FIG. 6 is estimated by minimizing the errors between the real ADC sample $x_{k-\Delta}$ and the estimated ADC sample $\hat{x}_{k-\Delta}$. This can be achieved using various adaptation methods, for example LMS adaptation. Once the estimated equivalent channel is obtained, the channel frequency response at DC, Nyquist and half Nyquist can be calculated and the CTLE can be adapted based on the frequency response in the CTLE adaptation circuit 214 as described in reference to FIG. 3.

The estimated ADC sample $\hat{x}_{k-\Delta}$ generated at the output of the ADC sample estimation circuit 618 is calculated as follows:

$$\hat{x}_{k-\Delta} = \Sigma_{i=0}^{L} h_i^{(n)} * d_{k-\Delta-i},$$

where L is the channel length, $h_i^{(n)}$ is the $i^{th}$ coefficient of the estimated impulse response $[h_0^{(n)}, h_1^{(n)}, \ldots, h_L^{(n)}]$ at time n. The error generated at the output of the subtractor circuit 626 is given by $$e_{k-\Delta} = x_{k-\Delta} - \hat{x}_{k-\Delta}.$$

The estimated impulse response coefficients $h_i^{(n)}$ are calculated as follows $$h_i^{(n+1)} = h_i^{(n)} - \mu * e_k * d_{k-i}.$$

The calculation of the estimated impulse response coefficients $h_i^{(n)}$ can be performed in arithmetic circuits in hardware or in software, or a combination of hardware and software using the elements of FIG. 1 for example.

The digital receiver of FIG. 6 having an ADC circuit is beneficial when implemented in long reach, high data rate SERDES applications. The advantage of the digital receiver of FIG. 6 is that there is less interaction between the CTLE adaptation and digital equalization. Therefore, there is less adaption noise for the CTLE, which makes the receiver more robust and stable.

Figure 7:
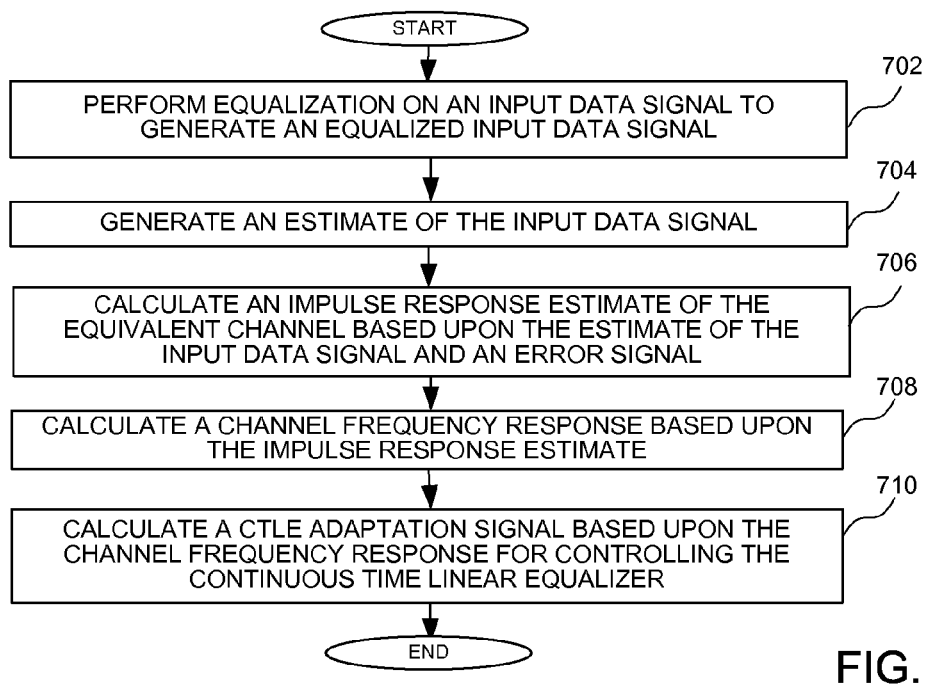
FIG. 7 is a flow chart showing a method of enabling the adaptation of an equalizer circuit.

Turning now to FIG. 7, a flow chart shows a method of enabling the adaptation of an equalizer circuit. In particular, equalization, such as by a continuous time linear equalizer, is performed on an input signal to generate an equalized input data signal at a block 702. An estimate of the input data signal is then generated at a block 704. For example, an output of the continuous time linear equalizer is received at a decision block, wherein the decision block generates an estimate of the input data signal. An impulse response estimate of the equivalent channel is calculated based upon the input data signal at a block 706. For example, the estimate of the input data signal and an error signal are received at a channel estimation block to generate an impulse response estimate of the equivalent channel. The impulse response estimate of the equivalent channel can be calculated in different ways according to the various implementations of FIGS. 3, 5, and 6. For example, the impulse response could be implemented using the channel estimation block 210 of FIG. 3, where the accumulation and low pass filter circuit 373, by accumulation and low pass filtering the correlations between the estimated data signal and error signal, generates an estimate of the equivalent channel. Alternatively, the impulse response could be calculated outputs of a DFE adaptation circuit, as described in reference to FIG. 5. In the implementation of FIG. 6, the impulse response could be generated based upon outputs of an ADC circuit, such as by the channel estimation circuit 617 of FIG. 6.

A channel frequency response is calculated based upon the impulse response estimate at a block 708, such as described above in reference to the frequency response computation circuit 374. A CTLE adaptation signal is calculated based upon the channel frequency response for controlling the continuous time linear equalizer at a block 710.

Figure 8:
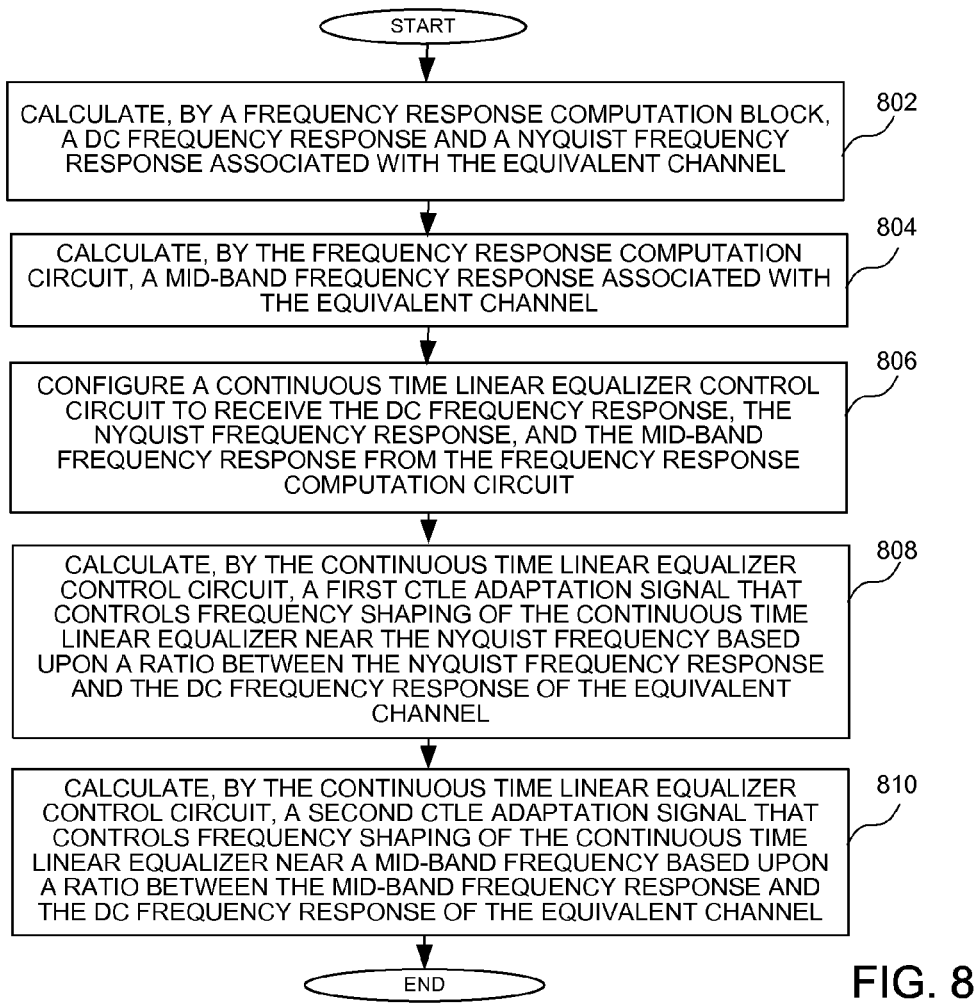
FIG. 8 is a flow chart showing a method of generating signals for enabling CTLE adaptation.

Turning now to FIG. 8, various signals for enabling CTLE adaptation signal may be generated as set forth above based upon frequency response calculations. In particular, a DC frequency response and a Nyquist frequency response associated with the equivalent channel are calculated by a frequency response computation circuit at a block 802. A mid-band frequency response, such as a half-Nyquist frequency response, associated with the equivalent channel is calculated by the frequency response computation circuit at a block 804. The DC frequency response, the Nyquist frequency response, and the half-Nyquist frequency response can be calculated as set forth above.

A continuous time linear equalizer control circuit is configured to receive the DC frequency response, the Nyquist frequency response, and the mid-band frequency response from the frequency response computation circuit at a block 806. A first CTLE adaptation signal that controls frequency shaping of the continuous time linear equalizer near the Nyquist frequency based upon a ratio between the Nyquist frequency response and the DC frequency response of the equivalent channel is calculated by the continuous time linear equalizer control circuit at a block 808. A second CTLE adaptation signal that controls frequency shaping of the continuous time linear equalizer near a mid-band frequency based upon a ratio between the mid-band frequency response and the DC frequency response of the equivalent channel is calculated by the continuous time linear equalizer adaptation circuit at a block 810. The first and second control signals could be the kl and kh values described above, for example.

The various elements of the methods of FIGS. 7 and 8 may be implemented using the circuits of FIGS. 1-6 as described, or using some other suitable circuits. While specific elements of the method are described, it should be understood that additional elements of the method, or additional details related to the elements, could be implemented according to the disclosure of FIGS. 1-6.

It can therefore be appreciated that new circuits for and methods of enabling an adaptation of an equalization circuit has been described. It will be appreciated by those skilled in the art that numerous alternatives and equivalents will be seen to exist that incorporate the disclosed invention. As a result, the invention is not to be limited by the foregoing embodiments, but only by the following claims.

We claim:

1. A circuit for enabling an adaptation of an equalization circuit, the circuit comprising:
    a continuous time linear equalizer configured to receive an input data signal and generate an equalized input data signal;
    a decision circuit configured to receive the equalized input data signal, wherein the decision circuit generates an estimate of the input data signal;
    a channel estimation circuit configured to receive the estimate of the input data signal and an error signal to generate an impulse response estimate of an equivalent channel;
    a frequency response computation circuit configured to receive the impulse response estimate of the equivalent channel and generate a channel frequency response having a DC frequency response and a Nyquist frequency response; and
    a continuous time linear equalizer control circuit configured to receive the channel frequency response and to generate a CTLE adaptation signal for controlling the continuous time linear equalizer;
    wherein the continuous time linear equalizer control circuit is configured to receive the DC frequency response and the Nyquist frequency response from the frequency response computation circuit.

2. The circuit of claim 1 wherein the frequency response computation circuit calculates the DC frequency response and the Nyquist frequency response associated with the equivalent channel.

3. The circuit of claim 1 wherein the continuous time linear equalizer control circuit calculates a first CTLE adaptation signal that controls frequency shaping of the continuous time linear equalizer near the Nyquist frequency based upon a ratio between the Nyquist frequency response and the DC frequency response of the equivalent channel.

4. The circuit of claim 3 wherein the frequency response computation circuit calculates a mid-band frequency response associated with the equivalent channel.

5. The circuit of claim 4 wherein the continuous time linear equalizer control circuit calculates a second CTLE adaptation signal that controls frequency shaping of the continuous time linear equalizer near a mid-band frequency based upon a ratio between the mid-band frequency response and the DC frequency response of the equivalent channel.

6. The circuit of claim 1 further comprising an accumulation and low pass filter circuit configured to receive correlations among the error signal and the equalized input data signal generated at an output of the continuous time linear equalizer to generate the impulse response estimate of the equivalent channel.

7. The circuit of claim 1 wherein the channel estimation circuit comprises a decision feedback equalizer adaptation circuit configured to receive the error signal and a data signal and to generate coefficients of a decision feedback equalizer, wherein the impulse response estimate of the equivalent channel comprises the coefficients of the decision feedback equalizer.

8. The circuit of claim 1 further comprising an ADC circuit configured to receive the equalized input data signal generated at an output of the continuous time linear equalizer and generate ADC samples, wherein the channel estimation circuit is configured to receive the ADC samples and the estimate of the input data signal and generate the impulse response estimate of the equivalent channel.

9. The circuit of claim 8 wherein the channel estimation circuit comprises an ADC sample estimation circuit configured to receive the estimate of the input data signal and the impulse response estimate of the equivalent channel.

10. A method of enabling an adaptation of an equalization circuit, the method comprising:
    performing equalization on an input data signal to generate an equalized input data signal;
    generating an estimate of the input data signal;
    calculating an impulse response estimate of an equivalent channel based upon the estimate of the input data signal and an error signal;
    calculating a channel frequency response, having a DC frequency response and a Nyquist frequency response, using the impulse response estimate;
    configuring a continuous time linear equalizer control circuit to receive the DC frequency response and the Nyquist frequency response; and
    calculating a CTLE adaptation signal based upon the channel frequency response for controlling a continuous time linear equalizer.

11. The method of claim 10 further comprising calculating the DC frequency response and the Nyquist frequency response associated with the equivalent channel.

12. The method of claim 10 further comprising calculating, by the continuous time linear equalizer control circuit, a first CTLE adaptation signal that controls frequency shaping of the continuous time linear equalizer near the Nyquist frequency based upon a ratio between the Nyquist frequency response and the DC frequency response of the equivalent channel.

13. The method of claim 12 further comprising calculating a midband frequency response associated with the equivalent channel.

14. The method of claim 13 further comprising calculating, by the continuous time linear equalizer control circuit, a second CTLE adaptation signal that controls frequency shaping of the continuous time linear equalizer near a mid-band frequency based upon a ratio between the mid-band frequency response and the DC frequency response of the equivalent channel.

15. The method of claim 10 further comprising calculating the impulse response estimate of the equivalent channel using correlations among the error signal and the equalized data signal generated at an output of the continuous time linear equalizer.

16. The method of claim 10 further comprising configuring a decision feedback equalizer adaptation circuit of the channel estimation circuit to receive the error signal and a data signal and to calculate coefficients of a decision feedback equalizer, wherein the impulse response estimate of the equivalent channel comprises the coefficients of the decision feedback equalizer.

17. The method of claim 10 further comprising configuring an ADC circuit to receive the equalized input data signal generated at an output of the continuous time linear equalizer and generate ADC samples, wherein a channel estimation circuit is configured to receive the ADC samples and the estimate of the input data signal and calculate the impulse response estimate of an equivalent channel.

18. The method of claim 17 further comprising configuring an ADC sample estimation circuit of the channel estimation circuit to receive the estimate of the input data signal and the impulse response estimate of the equivalent channel.

* * * * *